United States Patent Office 3,464,956
Patented Sept. 2, 1969

3,464,956
AMMONIUM BIBORATE AND AMMONIUM PENTABORATE CATALYZED AND CO-REACTED PHENOL FORMALDEHYDE RESINS
Kenneth C. Petersen, Scotia, N.Y., assignor to Schenectady Chemicals, Inc., Schenectady, N.Y., a corporation of New York
No Drawing. Filed Jan. 15, 1968, Ser. No. 697,640
Int. Cl. C08g 5/10
U.S. Cl. 260—57                                               9 Claims

ABSTRACT OF THE DISCLOSURE

Thermoplastic novolak resins are prepared from phenol or cresol and formaldehyde using ammonium biborate or ammonium pentaborate as a catalyst.

---

The present invention relates to the preparation of phenol-formaldehyde resins.

It is known to prepare thermosetting phenolformaldehyde resins employing boric acid or borax as a catalyst, e.g. note Deutsch patent 1,678,107 and Barsky patent 2,060,457 or zinc borate, e.g. note Huck patent 3,332,911 and Borschert patent 3,083,183. Boric acid has also been employed in preparing novolaks, Mitchell patent 2,855,382.

When borax is employed, a thermosetting resin is obtained.

It is an object of the present invention to prepare novel phenol-formaldehyde resins.

Another object is to prepare thermoplastic phenol-formaldehyde resins having increased thermal stability when made thermosetting with hexamethylene tetramine.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a phenol-formaldehyde resin employing an ammonium borate as the catalyst. The resins prepared are normally thermoplastic novolaks, even though the borates are slightly alkaline (although less alkaline than borax), and can be converted to thermosetting resins by the addition of hexamethylene tetramine as is conventional with novolaks.

The thermoplastic products of the present invention can be used wherever novolaks are employed. They are particularly useful in preparing thermosetting resins by the addition of hexamethylene tetramine which resins have superior heat resistance to commercial thermosetting phenol-formaldehyde resins or phenol-formaldehyde resins prepared with borax, zinc borate or manganese borate catalysts.

Unless otherwise indicated, all parts and percentages are by weight.

There can be used as catalysts ammonium bi-borate (diammonium tetraborate) or ammonium pentaborate or mixtures of such borates. The preferred proportions are 6 to 25% based on the phenolic reactant although these proportions can be varied.

As the phenol there can be employed phenol itself and m-cresol or cresol mixtures which contain enough functionality on the ring to give a resin which will thermoset upon addition of hexamethylene tetramine. Thus there can be used commercial m-p-cresol or cresylic acid or a mixture of phenol with one or more cresols to enhance flowability of the resin. There can be added minor amounts of higher alkyl phenols such as p-t-butylphenol, p-t-amylphenol, p-isooctyl phenol, p-dodecyl phenol, p-octadecyl phenol, a mixture of alkylphenols having 16–20 carbon atom alkyl groups in the para position, etc.

The ratio of formaldehyde to phenol can be within the range conventional in the art for making novolak resins. Proportions 0.7 to 1.25 mole of formaldehyde per 1.0 mole of phenol have been employed satisfactorily. Usually not over 0.95 mole of formaldehyde is used.

While the preferred source of formaldehyde is aqueous formaldehyde, e.g. as formalin, there can also be employed trioxane or paraformaldehyde. Mixtures of formaldehyde sources can also be used. Thus a 50–50 mole percent mixture of aqueous formaldehyde to paraformaldehyde gave a satisfactory resin according to the invention.

The reaction of the phenol and formaldehyde in the presence of the ammonium borate catalyst is carried out for 5 to 18 hours, conveniently employing reflux conditions, e.g. 103° C. and the volatiles, e.g. water, are distilled at 150–180° C. The preferred distillation temperature is 170° C. since at this temperature the resin remains in solution and does not become very cloudy in appearance.

The thermoplastic resin prepared is discharged from the kettle in molten state. When it is desired to make the resin thermosetting, hexamethylene tetramine is added in conventional amounts, e.g. 5 to 15% of the resin. Of course other conventional sources of formaldehyde, e.g. paraformaldehyde and trioxane, can be added to convert the thermoplastic novolak to a thermosetting resin.

The thermosetting resins prepared by the addition of hexamethylene tetramine or other formaldehyde source are particularly valuable as disc pad binders (in brake linings, grinding wheel binders and molding compound binders.

EXAMPLE 1

7,500 grams of phenol, 5,430 grams of uninhibited 37% aqueous formaldehyde and 1,080 grams of ammonium biborate (about 14% of the phenol were mixed and heated to reflux and refluxed for 10 hours. The product was distilled atmospherically to 168 to 175° C. The batch was then poured and allowed to cool. The resin had a Ball and Ring M.P. of 108° C.

EXAMPLE 2

7,605 grams of phenol, 1,017 grams of o-cresol, 1,143 grams of ammonium pentaborate, 3,060 grams of uninhibited 37% aqueous formaldehyde and 1,134 grams of paraformaldehyde were heated to reflux and refluxed for 10 hours. The product was distilled atmospherically to 170–180° C. The batch was then poured and allowed to cool. The resin had a Ball and Ring M.P. of 111° C.

EXAMPLE 3

500 grams of phenol, 362 grams of uninhibited 37% aqueous formaldehyde and 30 grams of ammonium biborate (6% based on the phenol) were heated to reflux and held there for 11 hours. The product was distilled atmospherically to 150° C. and the heat turned off. At 140° C. there was added 500 grams of isopropanol and the batch then cooled to room temperature to give a solution containing 44.5% solids, a viscosity of B½ (Gardner-Holt) and a pH of 4.5. The product was useful as a varnish which had improved heat resistance upon addition of hexamethylene tetramine than similar phenolic varnishes prepared with catalysts other than ammonium borates.

EXAMPLE 4

500 grams of phenol, 362 grams of uninhibited 37% aqueous formaldehyde and 90 grams of ammonium biborate (18% based on the phenol) were heated to reflux and held there for 8.75 hours. The product was distilled atmospherically to 165° C., poured into a pan and cooled. The resin had a Ball and Ring M.P. of 87° C.

EXAMPLE 5

2,000 grams of phenol, 1,448 grams of uninhibited 39% formaldehyde and 500 grams of ammonium biborate (25% on the phenol) were heated to reflux and held there for 5 hours. The product was distilled atmospherically to 160° C. A full vacuum was applied for 5 minutes while distillation was continued. The batch was poured and allowed to cool. The resin had a Ball and Ring M.P. of 134° C.

EXAMPLE 6

The thermal stability of the resins of the present invention was measured by pulverizing approximately 2 grams of the resin, mixing with 10% hexamethylene tetramine based on the resin, curing at 275° F. for 1 hour and placing the cured mixture in a 750° F. oven and weighing the mixture at the indicated intervals. The results are set forth in Table 1. In the table SG-3173 designates a commercial phenol-formaldehyde novolak similarly mixed with 10% of hexamethylene tetramine and similarly cured.

TABLE 1

| Resin | Percent of original resin left after— | | |
|---|---|---|---|
|  | 1 hour | 2 hours | 4 hours |
| Example 1 | 48 | 35 | 27 |
| Example 2 | 54 | 35 | 28 |
| Example 3 | 39 | 15 | 10 |
| Example 4 | 74 | 65 | 50 |
| Example 5 | 66 | 52 | 45 |
| SG-3173 | 34 | 2 | Ash (nil) |

The excellent weight retention of the ammonium borate phenol-formaldehyde novolak resins (with hexa) versus the poor weight retention of a standard phenol-formaldehyde novolak resin (with hexa) is clearly shown by the table.

EXAMPLE 7

The percent weight retention of four phenol-formaldehyde novolak resins cured with 10% hexamethylene tetramine for 1 hour at 275° F. and then subjected to 750° F. for 1, 2 and 4 hours is shown in Table 2.

TABLE 2

| Catalyst | Percent weight retention | | |
|---|---|---|---|
|  | 1 hour | 2 hours | 4 hours |
| Zinc borate (5%) | 46.3 | 15.9 | 5.7 |
| Manganese borate (5%) | 11.3 | 4.5 | Ash |
| Ammonium pentaborate (8%) | 62.0 | 44.0 | 27.0 |
| Ammonium pentaborate (15%) | 67.8 | 59.3 | 40.0 |

I claim:
1. A process of preparing a phenol-formaldehyde novolak comprising heating a phenol with formaldehyde in the presence of sufficient ammonium borate selected from the group consisting of ammonium biborate and ammonium pentaborate to increase the heat resistance of cured resins prepared from the novolak, the phenol having a sufficient functionality to form a thermosetting resin with additional formaldehyde, the formaldehyde employed being insufficient to cause the resin to be thermosetting.

2. A novolak prepared by the process of claim 1.

3. A process according to claim 1 wherein the phenol includes a member of the group consisting of phenol per se and o-cresol, and the ammonium borate is selected from the group consisting of ammonium biborate and ammonium pentaborate.

4. A novolak prepared by the process of claim 3.

5. A process according to claim 3 wherein the phenol is phenol per se.

6. A process according to claim 3 wherein the borate is present in an amount of 6 to 25% by weight of the phenol.

7. A process according to claim 6 wherein the formaldehyde is 0.7 to 0.95 moles per mole of phenol.

8. A process according to claim 1 including the additional steps of adding sufficient hexamethylene tetramine to form a thermosetting resin and curing the thus formed mixture.

9. A cured thermoset resin prepared by the process of claim 8.

References Cited

UNITED STATES PATENTS

| 2,667,466 | 1/1954 | Nagy | 260—51 |
| 2,855,382 | 10/1958 | Mitchell | 260—57 |
| 3,332,911 | 7/1967 | Huck | 260—57 |

WILLIAM H. SHORT, Primary Examiner

H. SCHAIN, Assistant Examiner

U.S. Cl. X.R.

260—33.4, 59